United States Patent
Rosaen

[11] 3,962,918
[45] June 15, 1976

[54] FLOW INDICATOR WITH WEIGHT BIASING MEANS

[75] Inventor: Nils O. Rosaen, Bloomfield Hills, Mich.

[73] Assignee: Nancy Rosaen, Ann Arbor, Mich.; a part interest

[22] Filed: Nov. 15, 1974

[21] Appl. No.: 523,999

[52] U.S. Cl. .................................. 73/228; 200/81.9 R
[51] Int. Cl.² .................................................. G01F 1/28
[58] Field of Search .......... 73/228, 430; 116/129 R; 200/81.9 R, 85 R

[56] References Cited
UNITED STATES PATENTS

| 354,508 | 12/1886 | Fraleigh | 340/244 |
|---|---|---|---|
| 1,119,648 | 12/1914 | Sheldon | 116/129 |
| 1,372,500 | 3/1921 | Gamille | 200/81.9 |
| 2,571,415 | 10/1951 | Brown | 116/129 |
| 2,765,656 | 10/1956 | Parshall | 73/228 |
| 2,892,348 | 6/1959 | Ekstrom, Jr. | 73/228 |
| 3,355,560 | 11/1967 | Murphy et al. | 73/228 |
| 3,380,302 | 4/1968 | Gelinas | 73/228 |
| 3,501,605 | 3/1970 | Hutchinson et al. | 200/81.9 |
| 3,729,604 | 4/1973 | Groff | 200/81.9 |
| 3,845,259 | 10/1974 | Spurr | 200/81.9 |

*Primary Examiner*—Herbert Goldstein
*Attorney, Agent, or Firm*—Gifford, Chandler & Sheridan

[57] ABSTRACT

A flow indicator for use in conjunction with a flow meter which imparts a rotational movement to a shaft in response to the fluid flow rate through the flow meter, wherein the flow indicator includes a pointer attached to the shaft which provides a visual indication of the flow rate through the flow meter. The shaft is biased in one rotational direction by a suspended weight which is attached by a flexible member to a pulley secured to the shaft. An electrical switch is also provided within the flow indicator housing and is actuated by movement of the weight.

1 Claim, 3 Drawing Figures

FLOW INDICATOR WITH WEIGHT BIASING MEANS

BACKGROUND OF THE INVENTION

I. Field of the Invention

The present invention relates to fluid systems and, more particularly, to a fluid device for indicating the rate of fluid flow through such system, and a new and improved means for biasing the indicator means towards a zero-flow position.

II. Prior Art

Positive displacement flow meters, such as described in my previous U.S. Pat. No. 3,282,102, issued on Nov. 1, 1966, impart a rotation to a shaft dependent upon the fluid flow through the flow meter. A pointer arm is secured to the end of the shaft externally of the flow meter and the pointer arm provides a visual indication of the rotation of the shaft and hence, the rate of flow through the flow meter.

The fluid flow responsive means, such as the vane in my aforementioned patent, is operatively connected with the shaft which is biased towards a zero-flow position. To achieve this end, previously known flow meters have utilized a torsion spring to bias the shaft, and hence the fluid flow measuring means connected therewith, towards a zero flow position. The previously known torsion spring biasing means, however, suffers from several disadvantages solved by the present invention. The most serious disadvantage of the previously known torsion spring biasing means is that the torsion spring is prone to failure from repetitive flexing. Such failure of the torsion spring not only necessitates expensive repair of the flow meter but also results in inaccurate flow meter readings until discovery of the torsion spring failure.

A second major problem incurred by the previously known torsion spring biasing means is that the rotation force transmitted to the shaft by the torsion spring varies over time due to fatigue of the spring. Spring fatigue produces increasingly inaccurate flow meter readings as time progresses and this inaccuracy is particularly noticable in low-flow flow meters.

Previously known indicator means for flow meters also frequently serve the additional function of activating an electrical switch when the fluid flow through the flow meter is relatively low. The electrical switch, in turn, activates electrical circuitry, and the like to energize a remote indicator or the like.

To achieve this function, previously known indicator means have included cam means operatively connected with the indicator shaft to actuate an electric switch when the rate of fluid flow reaches a predetermined condition. The previously known cam actuated switch means for flow indicators have proven to be somewhat unsatisfactory. Such switch assemblies are not only expensive to manufacture but, like the previously known torsion springs, are also prone to failure. Failure of the electric switch and/or its cam actuating means produces the serious consequence that substitution of a clean filter element for a dirty filter element will not occur thereby permitting a back up in the fluid system.

SUMMARY OF THE INVENTION

The present invention overcomes the above mentioned disadvantages of the previously known indicators for flow meters by providing a suspended weight attached by a flexible member such as a wire to a pulley rotatably carried by the indicator shaft. The weight biases the indicator shaft in one rotational direction with a force which, unlike a torsion spring, does not vary with the passage of time.

The vertical elevation of the weight, which varys proportionately with the rotational position of the indicator shaft, is utilized to close an electrical switch when the fluid flow through the flow meter reaches a predetermined low level. The electrical switch comprises a first electrical contact constructed of resilient metal and a second electrical contact disposed under the first contact and having at least a portion thereof in vertical alignment with the first contact. The electrical switch is disposed under the weight so that during a period of low fluid flow through the flow meter, the weight will push the first contact down onto the second contact and close the switch. The switch in turn activates electrical circuitry to energize a signal light, sound an alarm, or the like.

The present invention thus provides a biasing and switch means for a flow meter indicator having elements which are not subject to fatigue and failure as previously known. The upper switch contact, which is subjected to a constant bending movement, is preferably of inexpensive construction. In order to facilitate replacement of the upper switch contact, the entire switch assembly is preferably mounted on a plug which is easily removable from the flow meter indicator.

BRIEF DESCRIPTION OF THE DRAWINGS

The flow indicator of the present invention will be more clearly understood by reference to the following detailed description when read in conjunction with the accompanying drawing, wherein like reference characters refer to like parts throughout the several views and in which.

DETAILED DESCRIPTION

Figure 1:
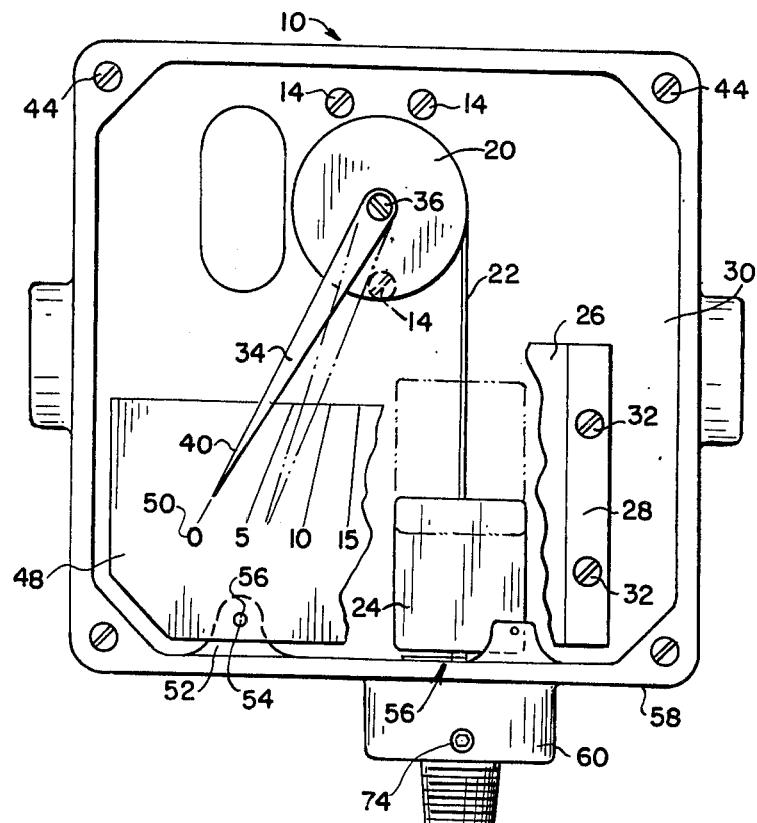
FIG. 1 is a front elevation view of the present invention with parts removed for purposes of clarity.

The fluid flow indicator 10 of the present invention is contained within a housing 11 which is mounted externally of and adjacent to a flow meter 12 by bolts 14. A gasket 16 provides sealing engagement between the flow indicator 10 and the flow meter 12 to keep dirt, moisture, and the like outside the housing 11.

The flow meter 12, which forms no part of the present invention, is preferably of the positive displacement type disclosed in my aforementioned patent wherein the flow meter 12 rotatably positions a shaft 18 in response to the rate of fluid flow through the flow meter 12. Appropriate sealing means (not shown) are included intermediate the shaft 18 and the flow meter 12 to prevent fluid communication along the surface of the shaft 18 between the flow indicator 10 and the fluid chambers (not shown) in the flow meter 12.

A pulley 20 is mounted on the shaft 18 and secured thereto by any conventional means, such as welding, a set screw, key, or the like, although the pulley 20 may also be integral with the shaft 18 without deviating from the spirit of the invention. A flexible wire segment 22 preferably constructed of braided metal strands, is secured in a conventional manner at its upper end to the pulley 20 and to a weight 24 at its lower end so that the wire segment 22 extends around at least a portion of the upper half of the pulley 20. The gravitational force on the weight 24 maintains the wire segment 22 between the weight 24 and the pulley 20 in a vertical position. As viewed from FIG. 1, the axis of rotation for the pulley 20 is horizontally offset from the wire segment 22. Thus the downward force on the wire segment 22 from the weight 24 produces a rotational torque on the pulley 20 and urges the pulley 20 with its attached shaft 18 in a clockwise direction. It should be apparent that as the pulley rotates in a counterclockwise direction (FIG. 1), the weight 24 will vertically rise.

A rectangular channel guide 26 having a flange 28 extending from one side is secured to the rear 30 of the housing 11 by bolts 32 or the like through the flange 28. The channel guide 26 is fastened to the housing 11 with its longitudinal axis vertically positioned and is adapted to receive the weight 24 therein. The channel guide 26 functions to prevent the weight 24 from swinging horizontally like a pendulum.

The flow indicator 10 further comprises a pointer arm 34 which is secured by a screw 36 onto the end of shaft 18 so that rotation of the shaft 18 causes a pivotal movement of the outer end 40 of the pointer arm 34. The pointer arm 34 is, in addition, mounted in front of the channel guide 26 so that the channel guide will not interfere with the pivotal movement of the pointer arm 34.

A front cover plate 42, preferably constructed of a transparent material such as glass or plastic, is secured to the front of the housing 11 by bolts 44 and encloses the front of the housing 11. An annular seal 46, disposed between the cover plate 42 and the edge of the housing 11, prevents the entry of foreign matter or the like into the interior of the housing 11.

Figure 2:
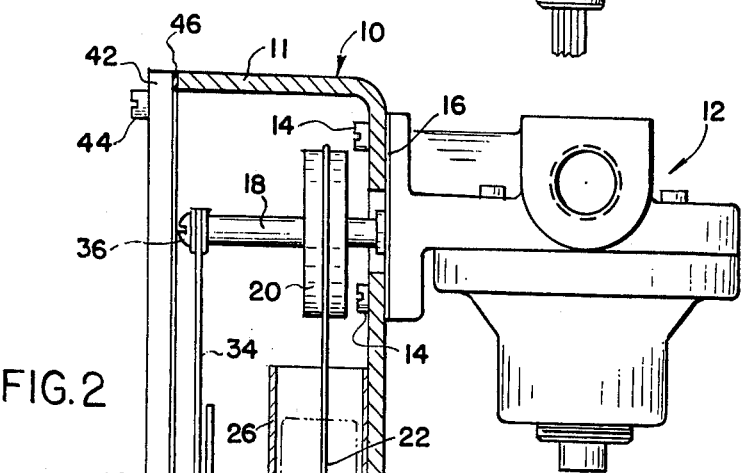
FIG. 2 is a partial cross sectional view of the present invention taken along line 2—2 of FIG. 1.
Figure 3:
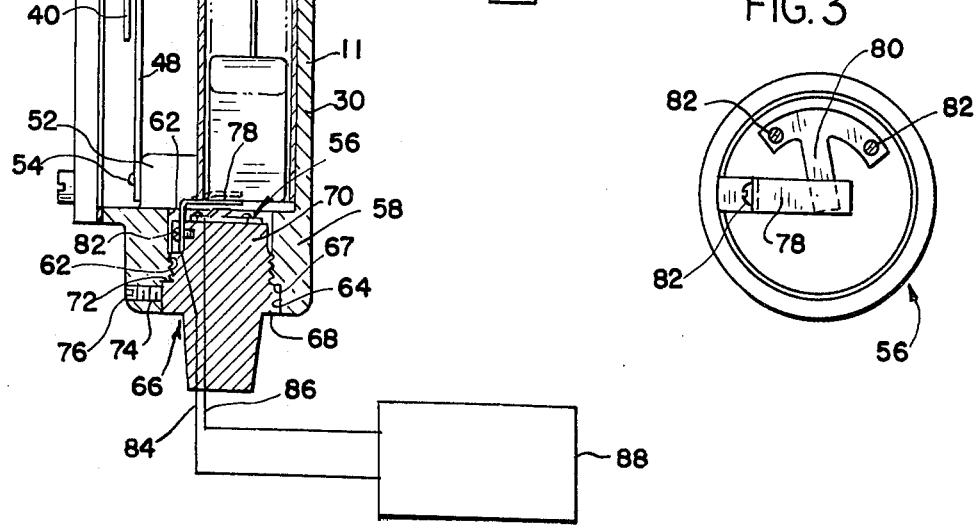
FIG. 3 is a top plan view of the electrical switch of the present invention and enlarged for clarity.

The interior of the housing 11 also includes an indicia plate 48, carrying appropriate indicia 50 thereupon, secured to the housing 11 behind the pointer arm 34 as best showed in FIG. 2. The indicia plate 48 may be secured to the housing 11 in any conventional manner, but in the preferred embodiment, the bottom of the housing 11 includes a boss 52 with a forwardly projecting pin 54. The indicia plate 48 has an aperture 56 so that the indicia plate 48 may be press fit onto the boss 52 with the pin 54 registering with the aperture 56 on the indicia plate 48. Several bosses 52 may, of course, be provided within the housing 11 to secure the indicia plate 48 as required or desired.

The operation of the flow indicator as thus far described may now be understood. Referring particularly to FIG. 1, during a zero-flow condition through the flow meter 12 the weight 24 will bias the shaft 18 via the pulley 20 to the extreme clockwise rotational position. During this condition the end 40 of the pointer arm 34 points to the "0" indicia 50 on the indicia plate 48.

As the fluid flow through the flow meter 12 begins, the shaft 18 rotates counterclockwise thereby winding the wire segment 22 around the pulley 20 and elevating the weight 24 toward the position shown in dotted lines. Simultaneously, the pointer arm 34 which is secured to the shaft 18 by the screw 36 will pivot rightward to the position again shown in dotted lines and provide an accurate reading on the indicia plate 48 of the fluid flow rate through the flow meter.

From the foregoing it can be seen that a new and improved biasing means has been described for flow indicators which eliminates the aforementioned problems associated with the previously known torsion spring biasing means. It should also be apparent that the flow indicator of the present invention is simple and inexpensive to construct and yet of such rugged construction that none of the component parts, unlike previously known flow indicators, are subjected to stresses which typically lead to component failure.

As an additional feature to the present invention, a simple and inexpensive electrical switch 56 is provided within the housing 11 which is closed when the fluid flow rate through the flow meter 12 reaches a predetermined low level. Unlike electrical switches in previously known flow indicators, the electrical switch 56 of the present invention is not only inexpensive to manufacture but also inexpensive to repair and/or replace.

Referring particularly to FIG. 2, the bottom 58 of the housing 11 includes a boss 60 with a threaded vertical bore 62 therethrough substantially underneath the channel guide 26. The bore 62 has an enlarged lower portion 64 thereby forming an annular abutment surface 67. A cylindrical plug 66 with external threads 65 and constructed of an insulating material such as plastic, is adapted to screw into the bore 62. The plug 66 has a lower enlarged portion 68 and an upper reduced portion 70 thus forming a second annular abutment surface 72 which abuts against the surface 67 to accurately vertically position the plug 60 within the bore 66. An allen set screw 74 which is threadably received in a traverse bore 76 through the boss 60, abuts against the enlarged portion 68 of the plug 66 to firmly hold the plug 66 in the bore 62. It can thus be seen that the plug 66 may be easily inserted into or removed from the bore 62 by simply tightening or the loosening the set screw 74 and respectively screwing or unscrewing the plug 66. It should be realized however that other means or methods may be utilized to secure the plug 66 within the bore 62 without deviating from the spirit or the scope of the invention.

The electric switch 56 generally comprises an upper and a lower electrical contact 78 and 80, respectively, which are electrically insulated from each other by the plug 66 and wherein at least a portion of each contact is in vertical alignment with each other. The upper contact 78 is constructed of resilient metal. The contacts may be secured to the plug 66 in any conventional manner, such as by screws 82 or may be encased within the plug material. Two wires 84 and 86 are connected by any conventional means such as the screws 82, soldering, or the like, to the contacts 78 and 80, respectively and extend out through the plug 66 to an electrical indicating means 88 or the like. The electrical indicating means 88, when activated, may perform any desired function such as energizing a warning light, sounding an alarm or the like.

The actuation of the switch 56 is as follows: When the fluid flow through the flow meter is at an acceptable rate, the weight 24 is elevated as shown by the dotted lines. During this condition the switch 56 is open since the contacts 78 and 80 are not in contact with each other (shown in phantom lines). As the fluid flow through the flow meter 12 decreases, the weight 24 descends, as previously described, and pushes the upper contact 78 down onto the lower contact 80 thereby closing the switch 56 and activating the electrical circuit 88. When the fluid flow through the flow meter 12 resumes a normal or acceptable flow rate, the weight 24 ascends and the upper switch contact 78 springs upward due to its resiliency to the position shown in phantom lines thereby opening the switch 56.

It is thus obvious that the switch 56 of the present invention represents a significant advance over previously known flow indicator switches in that it provides a simple, inexpensive, and easily accessible electrical switch. It should also be apparent that the upper switch contact 78, which is the only component of the switch subjected to repetitive bending and, hence, failure, may be quickly and inexpensively replaced rather than the expensive replacement of the entire switch assembly as has been the common practice in previously known flow indicator switches.

Having thus described my invention many modifications and alterations will become apparent to those skilled in the art to which it pertains without departing from the spirit of the invention as defined by the scope of the appended claims.

I claim:

1. A fluid flow meter adapted to provide a visual indication of the fluid flow rate through said flow meter, said flow meter having a housing and being of the type which imparts a rotation to a shaft in response to a variation in the flow rate through said flow meter, said flow meter further comprising indicator means operably connected to said shaft and adapted to give a visual indication of the rotational position of said shaft; means biasing said shaft in a direction opposite to that produced by fluid flow through said flow meter, said biasing means comprising a pulley mounted on said shaft; a weight, and an elongated flexible member having one end secured to said pulley and the other end secured to said weight, the length of said flexible member being such that said weight is suspended by said flexible member through substantially the entire fluid flow range of said indicator means, a channel guide secured to said housing and adapted to receive the weight therein to guide said weight along a substantially vertical axis, and an electrical switch disposed on a plug, said plug being removably mounted in a bore in said housing at the base of said channel guide and including an abutment surface which cooperates with an abutment surface in said bore to thereby vertically position said plug, and wherein said switch further comprises a first resilient contact and a second contact, said contacts having at least a portion of each contact in vertical alignment with the other, wherein at least one of said contacts is disposed under said weight so that said weight engages said last mentioned contact at the lowermost vertical position of said weight and depresses said last mentioned contact to thereby actuate said switch.

* * * * *